(12) United States Patent
Cooksey et al.

(10) Patent No.: US 9,540,136 B2
(45) Date of Patent: Jan. 10, 2017

(54) CONTROL BOX FOR GENERATOR SET

(71) Applicant: Caterpillar Inc., Peoria, IL (US)

(72) Inventors: Anthony S. Cooksey, Metamora, IL (US); Jonathan E. Goldsworthy, Irmo, SC (US); Lyle M. Sewall, Peachtree City, GA (US); Anthony Rakaric, West Lafayette, IN (US); Ryan C. Byrd, Griffin, GA (US); Matthew Weber, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 273 days.

(21) Appl. No.: 14/466,007

(22) Filed: Aug. 22, 2014

(65) Prior Publication Data
US 2016/0056688 A1 Feb. 25, 2016

(51) Int. Cl.
*B65D 6/28* (2006.01)
*H02B 1/00* (2006.01)
*F02B 63/04* (2006.01)

(52) U.S. Cl.
CPC ........ *B65D 7/34* (2013.01); *H02B 1/00* (2013.01); *F02B 63/044* (2013.01)

(58) Field of Classification Search
CPC .... H05K 5/0013; H05K 3/284; H05K 3/3447; A47J 37/08; E05Y 2900/208; F02B 63/04; F02B 2063/045; F02B 75/16
USPC ........ 290/1 A; 220/4.02; 361/748; 29/525.13
See application file for complete search history.

(56) References Cited

U.S. PATENT DOCUMENTS

| 3,489,911 | A | | 1/1970 | Varner et al. | |
|---|---|---|---|---|---|
| 4,117,342 | A | * | 9/1978 | Melley, Jr. | B60P 3/00 290/1 A |
| 4,495,901 | A | * | 1/1985 | Nannini | F02B 63/04 123/195 C |
| 4,698,975 | A | * | 10/1987 | Tsukamoto | F02B 63/04 123/2 |
| 5,107,073 | A | * | 4/1992 | Steffen | B29C 65/08 150/131 |
| 5,944,210 | A | * | 8/1999 | Yetter | H02G 3/081 220/241 |
| 6,563,048 | B2 | * | 5/2003 | Holt | H02B 1/308 174/50 |
| 6,758,169 | B2 | * | 7/2004 | Suzuki | F02B 63/04 123/3 |

(Continued)

FOREIGN PATENT DOCUMENTS

| CN | 202713812 | 1/2013 |
|---|---|---|
| GB | 2507822 | 5/2014 |
| JP | 2000328954 | 11/2000 |

*Primary Examiner* — Tulsidas C Patel
*Assistant Examiner* — Charles Reid, Jr.

(57) ABSTRACT

A control box for a generator set, including a support structure configured to be mounted to a rail. The support structure can include a first planar panel configured to be mounted to the rail, and a second planar panel offset from the first planar panel and configured to be mounted to the rail. The control box can also include a top cover configured to be connected to the first planar panel and the second planar panel and to cover a top portion of the support structure, a first side cover configured to be connected to the first planar panel and the second planar panel and substantially perpendicular to the top cover, and a second side cover configured to be offset from the first side cover and configured to be connected to the first planar panel and the second planar panel.

14 Claims, 7 Drawing Sheets

(56) References Cited

U.S. PATENT DOCUMENTS

| | | | | |
|---|---|---|---|---|
| 6,822,347 B2 * | 11/2004 | Roley | ............... | B60L 3/0069 |
| | | | | 180/271 |
| 6,861,585 B1 * | 3/2005 | Kiely | ............... | H01R 9/2475 |
| | | | | 174/480 |
| 6,979,783 B2 * | 12/2005 | Weise | ............... | H02G 3/086 |
| | | | | 174/135 |
| 7,816,602 B2 * | 10/2010 | Landry | ............. | G02B 6/4452 |
| | | | | 174/17 R |
| 7,978,460 B2 | 7/2011 | Dykes | | |
| 8,052,001 B2 * | 11/2011 | Chen | ............... | H05K 5/063 |
| | | | | 220/4.02 |
| 8,143,755 B2 | 3/2012 | Gravlin et al. | | |
| 8,254,089 B2 | 8/2012 | Cosley et al. | | |
| 8,353,120 B2 * | 1/2013 | Burns | ............... | G09F 7/10 |
| | | | | 40/486 |
| 8,450,863 B2 | 5/2013 | Farr et al. | | |
| 8,450,864 B2 | 5/2013 | Kawakita et al. | | |
| 8,456,806 B2 | 6/2013 | Cosley et al. | | |
| 8,471,144 B2 * | 6/2013 | Kleiss | ............... | H02G 3/08 |
| | | | | 174/50 |
| 8,558,110 B1 * | 10/2013 | Shotey | ............ | H02G 3/086 |
| | | | | 174/50 |
| 2007/0132243 A1 * | 6/2007 | Wurtele | ............ | F01N 13/08 |
| | | | | 290/1 A |
| 2013/0099492 A1 | 4/2013 | Hiranuma et al. | | |
| 2013/0147203 A1 * | 6/2013 | Gillett | ............. | F02B 63/044 |
| | | | | 290/1 A |
| 2014/0362541 A1 * | 12/2014 | Kim | ............... | G06F 1/1601 |
| | | | | 361/748 |

\* cited by examiner

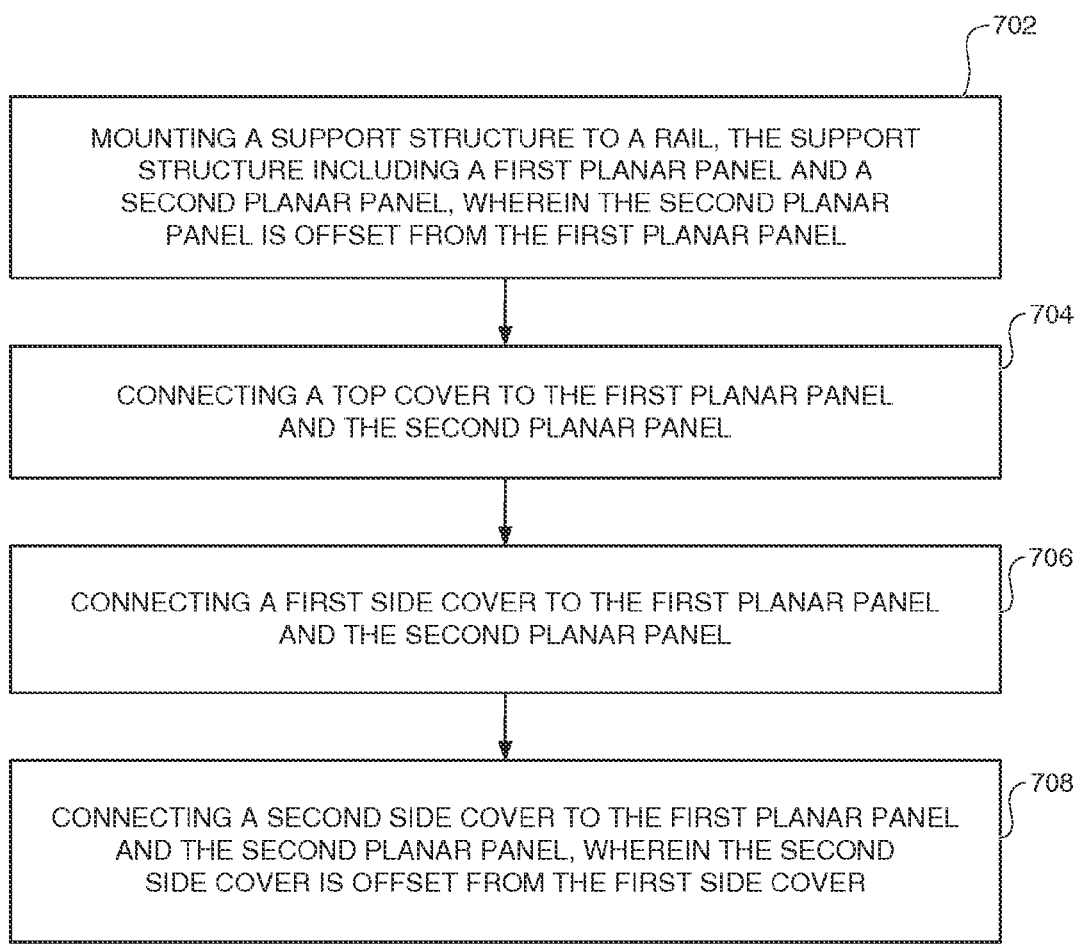

ized, the electronic devices may be housed in a control box. Thus, the control box may require complicated assembly and construction to ensure that it meets the structural requirements to house the volume of electronic devices. This can increase a manufacturing cost of the control box.
CONTROL BOX FOR GENERATOR SET

TECHNICAL FIELD

The present disclosure relates generally to a generator set, and more specifically to a control box for a generator set.

BACKGROUND

A generator set may comprise an engine connected to a generator. The generator may be controlled by one or more electronic devices. However, due in part to the sheer volume of electronic devices and the necessity to keep them organized, the electronic devices may be housed in a control box. Thus, the control box may require complicated assembly and construction to ensure that it meets the structural requirements to house the volume of electronic devices. This can increase a manufacturing cost of the control box.

One proposed solution for control boxes is disclosed in U.S. Pat. No. 8,450,863 to Farr, et al. (hereinafter the '863 patent). The '863 patent discloses a vibration dampened power generation aggregate including an internal combustion engine, generator and outlet box mounted upon a frame having vibration dampening mounts for the power generation aggregates.

The outlet box as an interior space divided into compartments for the placement of accessories, switches and generator governors. The frame has a first side and a second side and the power generation aggregate is mounted on the frame such that the mass of the power generation aggregate is evenly distributed on the first and second sides to reduce harmonic vibration and sound transmission of the power generation aggregate on the frame during aggregate operation.

While the outlet box in the '863 patent has vibration dampening features, there is no indication that the structural requirements are reduced. That is, there is no indication that the complicated assembly and construction of the outlet box in the '863 patent has been eased.

The system and method of the present disclosure solves one or more problems set forth above and/or other problems in the art.

SUMMARY

In one aspect, the present disclosure is directed to a control box for a generator set. The control box can include a support structure configured to be mounted to a rail. The support structure can include a first planar panel configured to be mounted to the rail, and a second planar panel offset from the first planar panel and configured to be mounted to the rail. The control box can also include a top cover configured to be connected to the first planar panel and the second planar panel and to cover a top portion of the support structure, a first side cover configured to be connected to the first planar panel and the second planar panel and substantially perpendicular to the top cover, and a second side cover configured to be offset from the first side cover and configured to be connected to the first planar panel and the second planar panel.

In another aspect, the present disclosure is directed a method of assembling a generator set, including mounting a support structure to a rail, the support structure including a first planar panel and a second planar panel, wherein the second planar panel is offset from the first planar panel. The method can also include connecting a top cover to the first planar panel and the second planar panel, connecting a first side cover to the first planar panel and the second planar panel, and connecting a second side cover to the first planar panel and the second planar panel, wherein the second side cover is offset from the first side cover.

In another aspect, the present disclosure is directed to a generator set including a rail, an engine configured to be mounted on the rail, a generator configured to be driven by the engine to generate electrical power, and configured to be mounted on the rail, and a control box. The control box can include a support structure configured to be mounted to the rail. The support structure can include a first planar panel configured to be mounted to the rail, and a second planar panel offset from the first planar panel and configured to be mounted to the rail. The control box can also include a top cover configured to be connected to the first planar panel and the second planar panel and to cover a top portion of the support structure, a first side cover configured to be connected to the first planar panel and the second planar panel and substantially perpendicular to the top cover, and a second side cover configured to be offset from the from the first side cover and configured to be connected to the first planar panel and the second planar panel.

BRIEF DESCRIPTION OF THE DRAWINGS

FIG. 7 depicts a process for assembling a generator set according to an embodiment.

DETAILED DESCRIPTION

Figure 1:
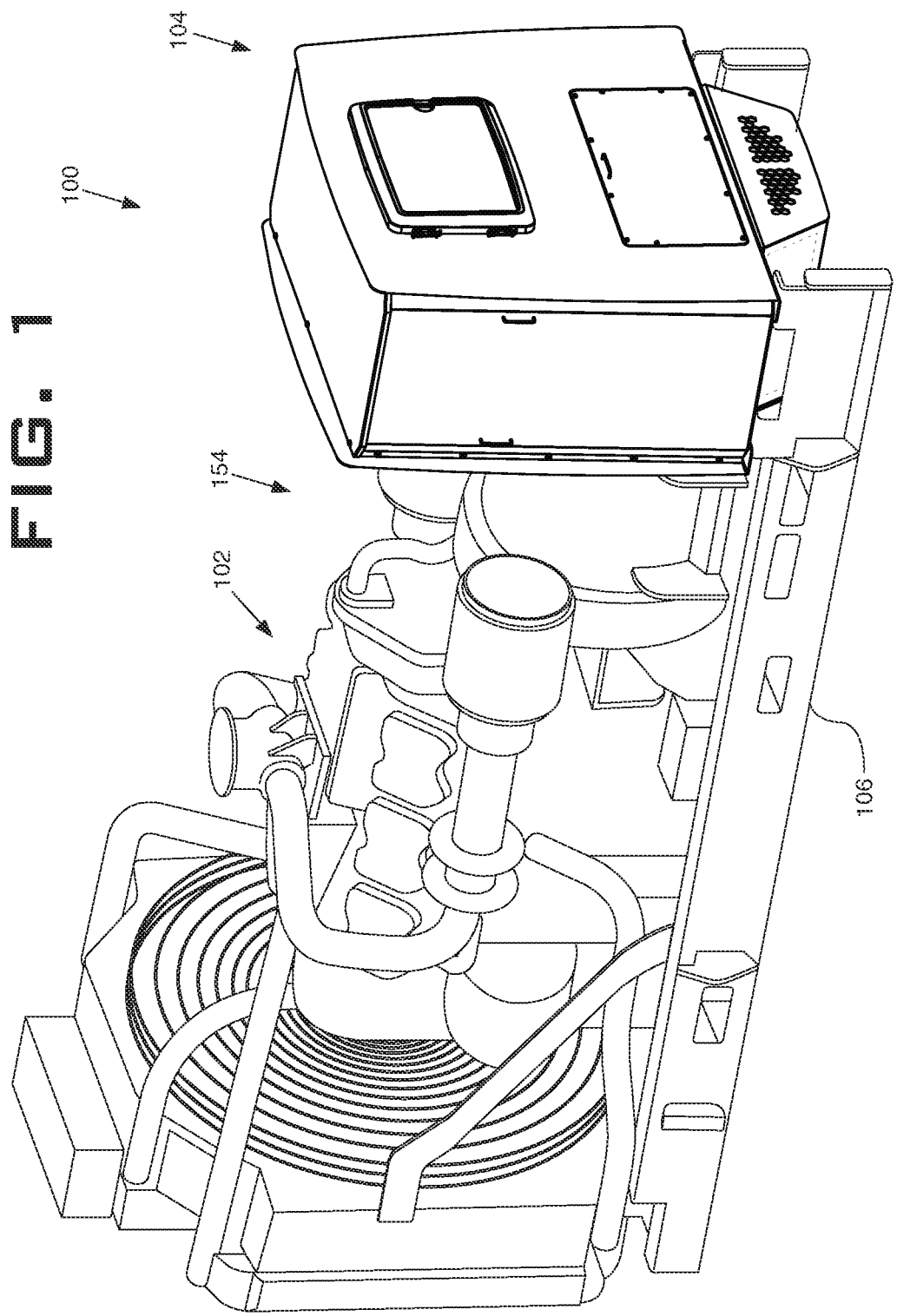
FIG. 1 is a perspective view of a generator set according to an embodiment.
Figure 2:
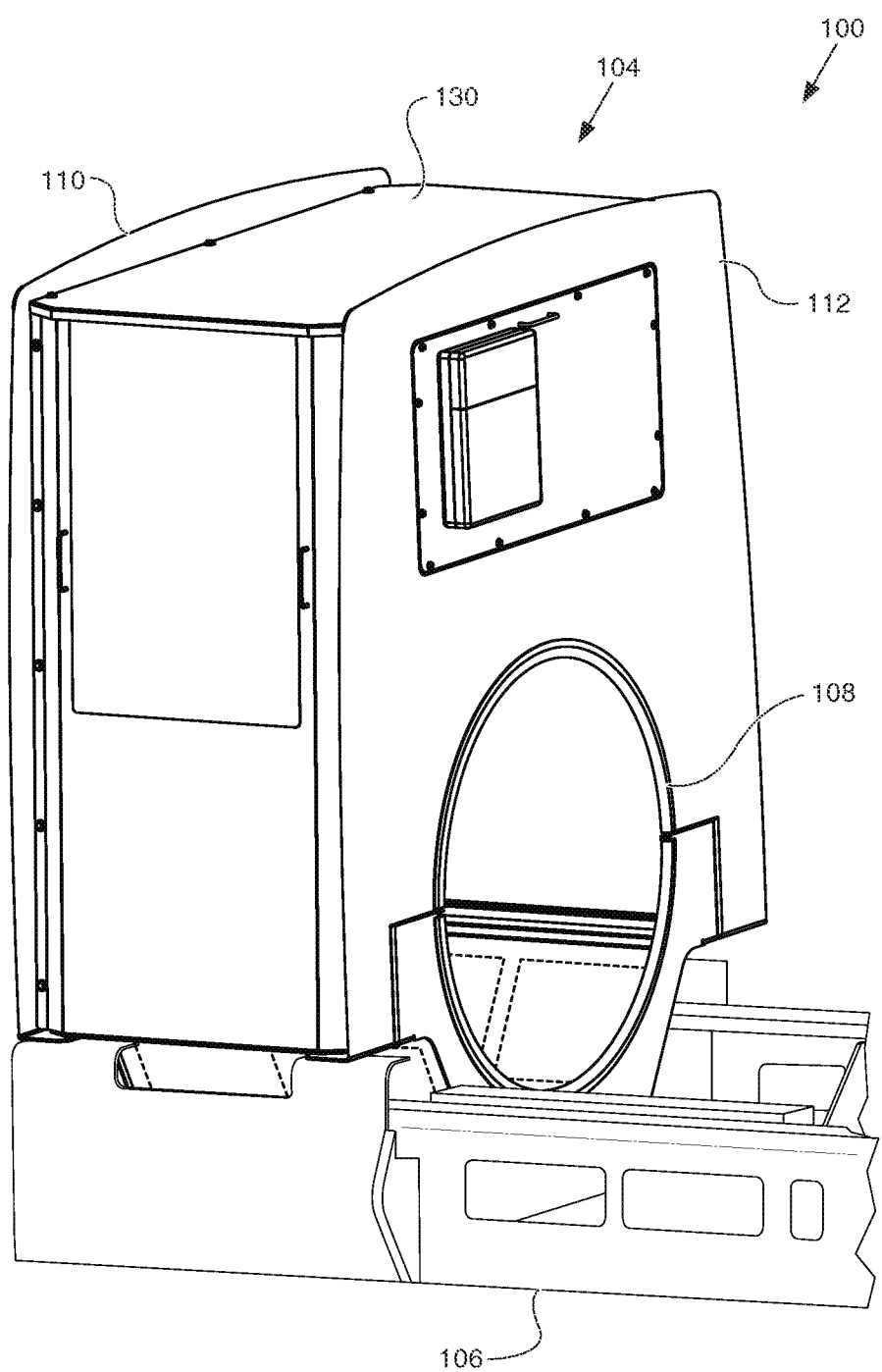
FIG. 2 is a reverse perspective view of a control box according to an embodiment.

FIGS. 1 and 2 depict a generator set 100 including a prime mover 102 and a generator 154. To control the generator set 100, the generator set 100 also includes a control box 104. The prime mover 102, the generator 154, and the control box 104 are configured to be mounted on a rail 106.

In an embodiment, the prime mover 102 can be configured to generate a rotating mechanical output. For the purposes of this disclosure, the prime mover 102 is depicted and described as a heat engine, for example, a combustion engine that combusts a mixture of fuel and air to produce the rotating mechanical output. One skilled in the art will recognize the prime mover 102 may be any type of combustion engine such as a diesel engine, a gasoline engine, or a gaseous fuel-powered engine.

The generator 154 may be, for example, an alternating current ("AC") induction generator, a permanent-magnet generator, an AC synchronous generator, or a switched-reluctance generator. In one embodiment, the generator 154 may include multiple pairings of poles (not shown), each pairing having three phases arranged on a circumference of a stator (not shown) to produce an alternating current with a frequency of 50 or 60 Hz. Electric power produced by the generator 154 may be directed offboard generator set 100 to a load.

In an embodiment, the load may include, for example, lights, motors, heating elements, electronic circuitry, refrigeration devices, air conditioning units, computer servers, industrial machines, etc.

The control box 104 can be configured to house equipment or electronic devices which can be utilized to control operations of the generator set 100. As can be seen in FIG. 2, the control box 104 includes a first planar panel 110, and a second planar panel 112. In an embodiment, the first planar panel 110 and the second planar panel 112 can be part of a support structure for the control box 104, and can be mounted to the rail 106. The support structure can also be mounted proximate the generator 154. This can allow the generator 154 to be partially placed within the control box 104 and be at least partially housed or covered by the control box 104, which will be described in more detail below.

Figure 3:
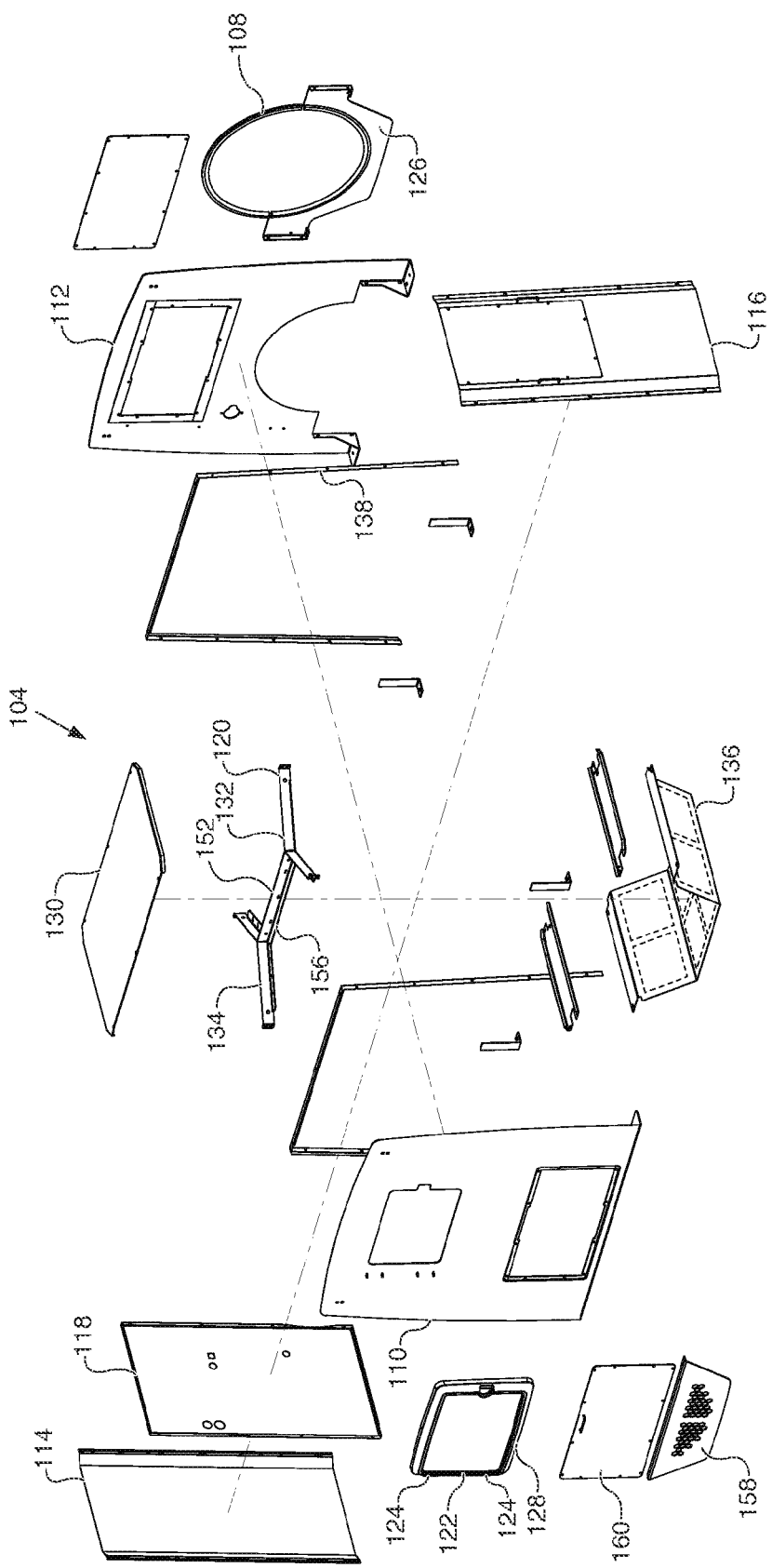
FIG. 3 is an exploded view of a control box shown in FIG. 2 according to an embodiment.

FIG. 3 depicts an exploded view of the control box 104. As shown in FIG. 3, the support structure can also include a side planar panel 118 and an upper support structure 120. The upper support structure 120 can comprise a first trapezoidal unit 132 and a second trapezoidal unit 134. The first trapezoidal unit 132 can comprise a first base 152, and the second trapezoidal unit 134 can comprise a second base 156. As seen in FIG. 3, the first trapezoidal unit 132 and the second trapezoidal unit 134 are connected at the first base 152 and the second base 156. In an embodiment, the first trapezoidal unit 132 and the second trapezoidal unit 134 can be mounted together using an adhesive, welding, fasteners, or any combination thereof. However, the first trapezoidal unit 132 and the second trapezoidal unit 134 can be formed from a unitary construction and therefore would not need to be connected together.

Although the upper support structure 120 comprises the first trapezoidal unit 132 and the second trapezoidal unit 134 in FIG. 3, more or less trapezoidal units may be utilized. In addition, the upper support structure 120 may utilize other units with different shapes in addition to or instead of trapezoidal units. The shapes could be selected so that they comprise sufficient structural strength to aid in supporting the first planar panel 110 and the second planar panel 112.

In addition, the control box 104 also comprises various covers to enclose the control box 104 such as a first side cover 114, a second side cover 116, and a top cover 130. The first side cover 114 can be configured to be connected to the first planar panel 110 and the second planar panel 112, and to be substantially perpendicular to the top cover 130. The first side cover 114 can also cover the side planar panel 118. The second side cover 116 can be configured to be offset from the first side cover 114 and to be connected to the first planar panel 110 and the second planar panel 112. The top cover 130 can be configured to be connected to the first planar panel 110 and the second planar panel 112, and to cover the upper support structure 120 and a top portion of the support structure.

In an embodiment, one or more of the first side cover 114, the second side cover 116, and the top cover 130 can be removably connected to the first planar panel 110 and the second planar panel 112. For example, the first side cover 114, the second side cover 116, and the top cover 130 can be connected to the first planar panel 110 and the second planar panel 112 using fasteners. Upon removal of the fasteners, the first side cover 114, the second side cover 116, and the top cover 130 can be disconnected or removed from the first planar panel 110 and the second planar panel 112.

In an embodiment, the first planar panel 110 and the second planar panel 112 can comprise substantially a first thickness while the top cover 130, the first side cover 114, and the second side cover 116 can comprise substantially a second thickness less than the first thickness. In an embodiment, the first thickness is approximately twice the thickness of the second thickness. For example, the first thickness can comprise approximately 4 mm while the second thickness can comprise approximately 2 mm. In an embodiment, the first thickness can comprise approximately between 3.0 mm to 4.0 mm, while the second thickness can comprise approximately between 1.5 mm to 2.0 mm. In an embodiment, the first planar panel 110 and the second planar panel 112 can comprise steel or other types of metal. For example, the first planar panel 110 and the second planar panel 112 can comprise sheet metal.

The control box 104 can also comprise a display panel 128. The display panel 128 can be rotated using hinges 124 on a display panel side 122. In an embodiment, the display panel 128 can be rotated about an axis substantially perpendicular to the top cover 130. That is, the display panel 128 can be opened side-to-side instead of top-to-bottom. In an embodiment, opening the display panel 128 can allow access to the various equipment or electronic devices located within the control box 104. Furthermore, opening the display panel 128 can allow the display panel 128 to be serviced.

In addition, the control box 104 can also comprise a ring 108 defining an aperture through which portions of the generator 154 can be housed or covered by the control box 104. In an embodiment, this can allow the various equipment or electronic devices located within the control box 104 to be connected to the generator 154. The ring 108 can be supported by a ring holder 126.

The control box 104 can also include additional structures such as a tray 136, a vent 158, and an access door 160. The tray 136 can aid in preventing objects housed within the control box 104 from hitting the floor. In an embodiment, the vent 158 can aid in allowing air to flow into the control box 104. The access door 160 can allow access to the various equipment or electronic devices located within the control box 104.

Figure 4:
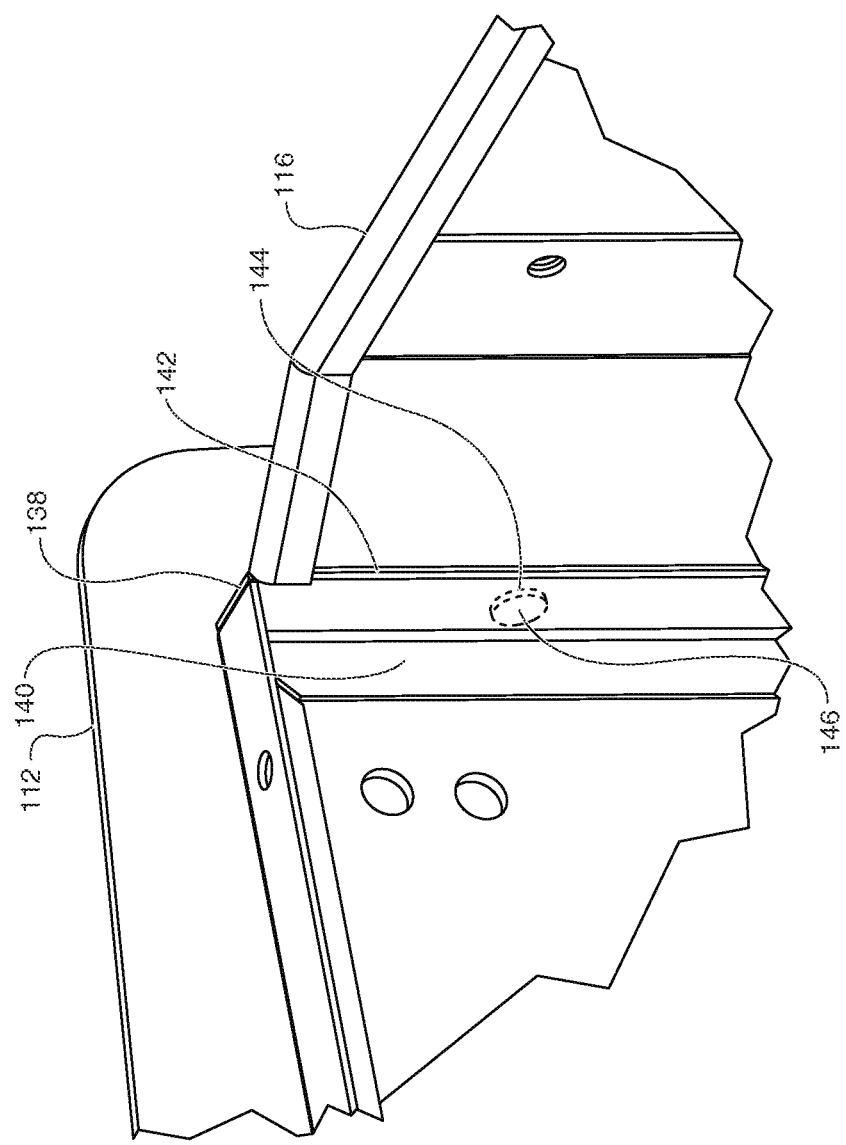
FIG. 4 is a close up view of a portion of a control box according to an embodiment.

To connect the various covers, panels, or other pieces to the support structure, mounting brackets and adhesives can be used as seen, for example in FIG. 4. In FIG. 4, the second side cover 116 is connected to the second planar panel 112 using a mounting bracket 138. The mounting bracket 138 comprises a first mounting bracket portion 140 and a second mounting bracket portion 142. In the embodiment shown in FIG. 4 the first mounting bracket portion 140 is adhered to the second planar panel 112 using an adhesive such as epoxy. However, additional or other types of adhesives can be used to secure the first mounting bracket portion 140 and the mounting bracket 138 to the second planar panel 112. Furthermore, the second mounting bracket portion 142 optionally defines one or more apertures 146 through which fasteners 144 can be utilized to secure the second mounting bracket portion 142 and the mounting bracket 138 to the second side cover 116. Thus, the second side cover 116 is connected to the second planar panel 112.

The fasteners 144 can also be welded to the second mounting bracket portion 142 and the second side cover 116 to further ensure a strong connection. In addition, the fasteners 144 can also be adhered to the second mounting bracket portion 142 and the second side cover 116 using an adhesive to further ensure a strong connection.

Alternatively, instead of utilizing the apertures 146 and the fasteners 144, the second mounting bracket portion 142 can be welded to the second side cover 116. Furthermore, the second mounting bracket portion 142 can be adhered to the second side cover 116 using an adhesive.

Figure 5:
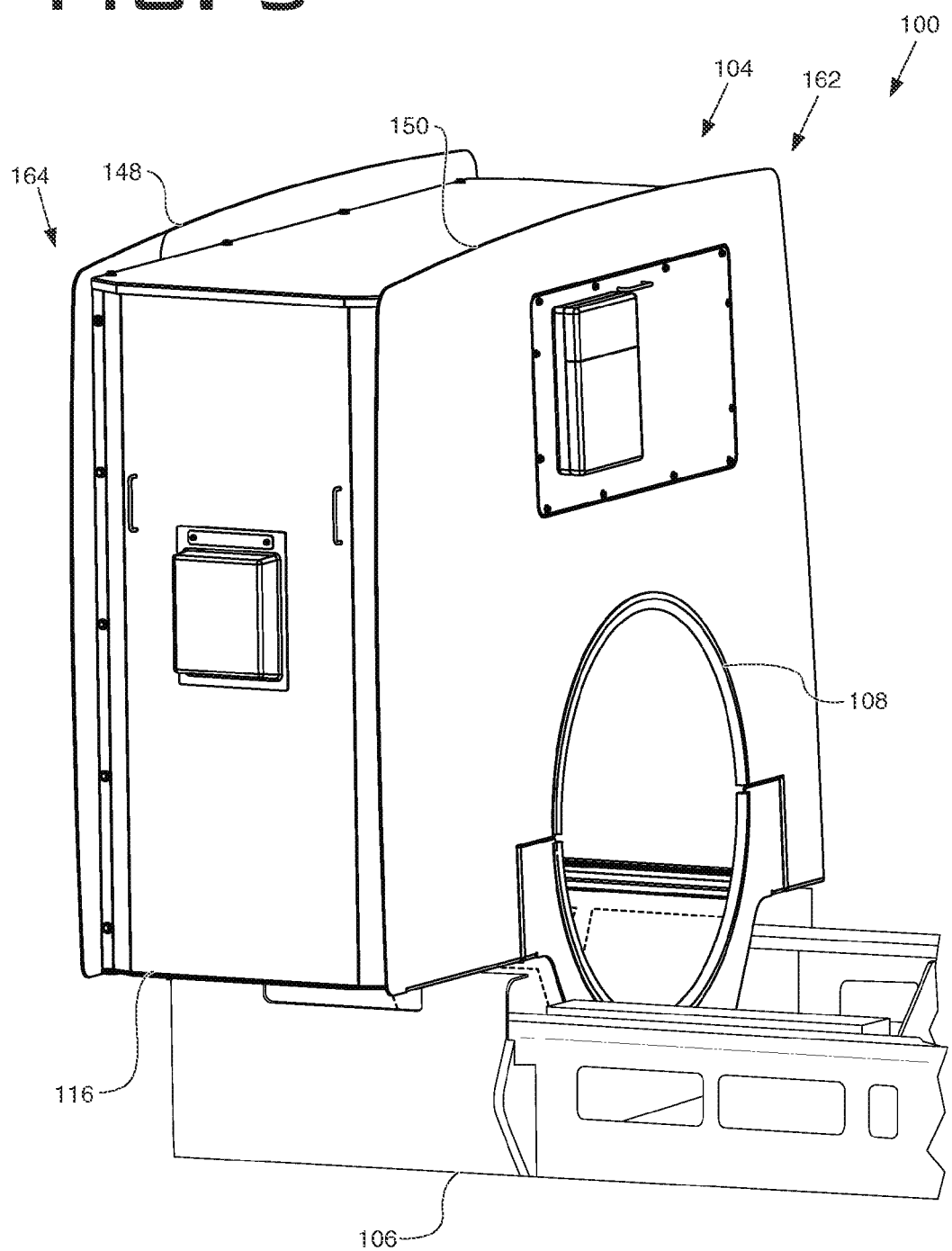
FIG. 5 is a reverse perspective view of a control box according to an embodiment.
Figure 6:
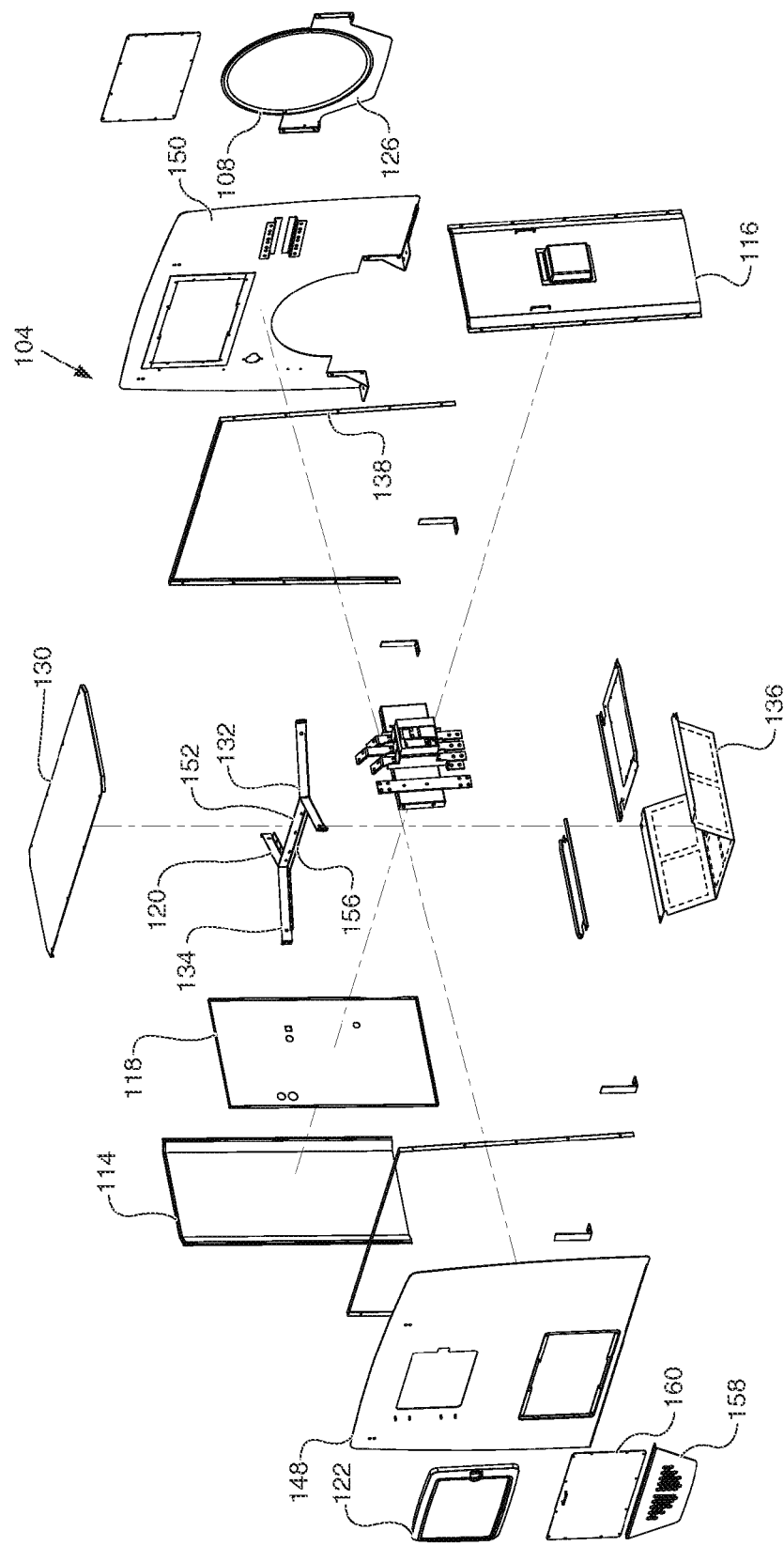
FIG. 6 is an exploded view of a control box shown in FIG. 5 according to an embodiment.

In an embodiment, the control box 104 shown in FIGS. 1-3 can comprise a symmetrical control box. However, in an embodiment, as shown in FIGS. 5 and 6, the control box 104 can comprise an asymmetrical control box. That is, a second side 164 of the control box 104 is longer than a first side 162 of the control box 104. Thus, the control box 104 can utilize a first planar panel 148 and a second planar panel 150 instead of the first planar panel 110 and the second planar panel 112. The first planar panel 148 and the second planar panel 150 each includes a second side corresponding to the second side 164 of the control box 104, which is longer than a first side corresponding to the first side 162 of the control box 104. However, in an embodiment, the first side 162 of the control box 104 can be longer than the second side 164 of the control box 104. Thus, the first planar panel 148 and the second planar panel 150 can each include a first side, which is longer than a second side.

INDUSTRIAL APPLICABILITY

In an embodiment, by utilizing the support structure in the control box 104, manufacturing costs of the generator set 100 can be reduced. For example, the first planar panel 110 and the second planar panel 112 can provide structural strength and support, and reduce the amount of components utilized. For example, the amount of nut-serts, fasteners, and seals utilized can be reduced. Furthermore, the first planar panel 110 and the second planar panel 112 can also function as an outside skin while providing structural strength and support. In an embodiment, the increased thickness of the first planar panel 110 and the second planar panel 112 can increase the structural strength and support of the first planar panel 110 and the second planar panel 112.

Additional manufacturing cost savings can also be realized by using an adhesive instead of welding to connect portions of the control box 104. This can reduce, for example, a number of specially trained personnel required for manufacturing of the control box 104 and the generator set 100. Furthermore utilizing an adhesive can reduce an amount of unsightly weld lines from welding. This can further increase an aesthetic appeal of the control box 104.

In an embodiment, when the generator set 100 comprises an asymmetrical control box, the control box 104 can comprise additional space. The additional space can be utilized to store additional electronic devices, such as a circuit breaker.

Furthermore by having the display panel 128 open in a side-to-side manner instead a of top-to-bottom manner, accessibility to the components within the control box 104 can be improved since a user may be able to maintain a more natural posture when accessing the components within the control box 104.

While the generator set 100 may be utilized in isolation, the generator set 100 may also be utilized within a whole fleet of generator sets. Thus, any manufacturing cost savings may have a multiplied factor when dealing with a fleet of generator sets.

In FIG. 7, a process for assembling the generator set 100 is shown. The generator set 100 can comprise, for example, the control box 104 shown in FIGS. 1-3. In 702, a support structure is mounted to the rail 106. The support structure can include the first planar panel 110 and the second planar panel 112. The second planar panel 112 can be offset from the first planar panel 110. In 704, the top cover 130 can be connected to the first planar panel 110 and the second planar panel 112. In 706, the first side cover 114 is connected to the first planar panel 110 and the second planar panel 112. In 708, the second side cover 116 is connected to the first planar panel 110 and the second planar panel 112. The second side cover 116 is offset from the first side cover 114. In an embodiment, the generator set 100 comprising the control box 104 shown in FIGS. 5 and 6 can also be assembled in a similar fashion.

It will be apparent to those skilled in the art that various modifications and variations can be made to the disclosed system and method. Other embodiments will be apparent to those skilled in the art from consideration of the specification and practice of the disclosed system and method. It is intended that the specification and examples be considered as exemplary only, with a true scope being indicated by the following claims.

The invention claimed is:

1. A control box for a generator set, comprising:
   a support structure configured to be mounted to a rail, wherein the support structure comprises:
      a first planar panel configured to be mounted to the rail; and
      a second planar panel offset from the first planar panel and configured to be mounted to the rail;
      a side planar panel configured to be connected to the first planar panel and the second planar panel; and
      an upper support structure perpendicular to the side planar panel and configured to be connected to the first planar panel and the second planar panel; wherein the upper support structure comprises a first trapezoidal unit having a first base and a second trapezoidal unit having a second base, wherein the first trapezoidal unit and the second trapezoidal unit are connected at the first base and the second base;
   a top cover configured to be connected to the first planar panel and the second planar panel and to cover a top portion of the support structure;
   a first side cover configured to be connected to the first planar panel and the second planar panel and substantially perpendicular to the top cover; and
   a second side cover configured to be offset from the first side cover and configured to be connected to the first planar panel and the second planar panel.

2. The control box of claim 1 wherein the first planar panel and the second planar panel comprise substantially a first thickness, and the top cover, the first side cover, and the second side cover, comprise substantially a second thickness less than the first thickness.

3. The control box of claim 1 wherein the top cover and the first side cover are connected to the first planar panel and the second planar panel using one or more mounting brackets and adhesive.

4. The control box of claim 3 wherein the adhesive comprises epoxy.

5. The control box of claim 3 wherein the one or more mounting brackets are adhered to the first planar panel or the second planar panel using the adhesive.

6. The control box of claim 1 further comprising a breaker circuit for a generator configured to be stored inside the support structure.

7. The control box of claim 1 further comprising a display panel connected to the first planar panel in a hinged manner, and configured to rotate about an axis substantially perpendicular to the top cover.

8. A method of assembling a generator set, comprising:
   mounting a support structure to a rail, the support structure including a first planar panel and a second planar panel, wherein the second planar panel is offset from the first planar panel, the support structure further comprising a side planar panel and an upper support structure substantially perpendicular to the side planar panel, wherein the upper support structure comprises a first trapezoidal unit having a first base and a second trapezoidal unit having a second base;

connecting a top cover to the first planar panel and the second planar panel;

connecting a first side cover to the first planar panel and the second planar panel; and connecting a second side cover to the first planar panel and the second planar panel, wherein the second side cover is offset from the first side cover.

9. The method of claim 8 further comprising connecting the first trapezoidal unit to the second trapezoidal unit by connecting the first base and the second base.

10. The method of claim 8 further comprising connecting the top cover and the first side cover to the first planar panel and the second planar panel using one or more mounting brackets and an adhesive.

11. The method of claim 10 further comprising adhering the one or more mounting brackets to the first planar panel or the second planar panel using the adhesive.

12. The method of claim 8 wherein the first planar panel and the second planar panel comprise substantially a first thickness, and the top cover, the first side cover, and the second side cover, comprise substantially a second thickness less than the first thickness.

13. The method of claim 8 further comprising connecting a display panel to the first planar panel in a hinged manner, so that the display panel is configured to rotate about an axis substantially perpendicular to the top cover.

14. A generator set comprising:
a rail;
an engine configured to be mounted on the rail;
a generator configured to be driven by the engine to generate electrical power, and configured to be mounted on the rail; and
the control box as recited in claim 1.

* * * * *